United States Patent
Jung (10) Patent No.: US 9,264,893 B2
(45) Date of Patent: Feb. 16, 2016

(54) METHOD FOR SELECTING ACCESS POINT WITH RELIABILITY

(75) Inventor: Hyunchul Jung, Gyeonggi-do (KR)

(73) Assignee: KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 0 days.

(21) Appl. No.: 13/977,884

(22) PCT Filed: Dec. 30, 2011

(86) PCT No.: PCT/KR2011/010409
§ 371 (c)(1),
(2), (4) Date: Jun. 25, 2014

(87) PCT Pub. No.: WO2012/091529
PCT Pub. Date: Jul. 5, 2012

(65) Prior Publication Data
US 2014/0304770 A1 Oct. 9, 2014

(30) Foreign Application Priority Data

Dec. 30, 2010 (KR) .................. 10-2010-0138873
Oct. 25, 2011 (KR) .................. 10-2011-0109134

(51) Int. Cl.
*H04W 12/02* (2009.01)
*H04W 12/12* (2009.01)
*H04W 12/10* (2009.01)

(52) U.S. Cl.
CPC .............. *H04W 12/02* (2013.01); *H04W 12/12* (2013.01); *H04W 12/10* (2013.01)

(58) Field of Classification Search
None
See application file for complete search history.

(56) References Cited

U.S. PATENT DOCUMENTS

| | | | | |
|---|---|---|---|---|
| 7,808,958 B1* | 10/2010 | Hernacki | ............. | H04W 12/12 370/229 |
| 2003/0204632 A1* | 10/2003 | Willebeek-LeMair et al. | .............. | 709/249 |
| 2004/0023640 A1* | 2/2004 | Ballai | ............... | H04L 63/10 455/411 |
| 2005/0060576 A1* | 3/2005 | Kime | .................. | H04L 63/1425 726/4 |
| 2005/0171720 A1* | 8/2005 | Olson | .................. | H04W 12/12 702/121 |
| 2006/0070113 A1* | 3/2006 | Bhagwat | ............... | H04W 12/12 726/2 |
| 2006/0150250 A1* | 7/2006 | Lee | .................... | H04L 63/1416 726/23 |
| 2006/0153138 A1* | 7/2006 | Asoh | ..................... | H04W 48/20 370/332 |
| 2007/0140163 A1* | 6/2007 | Meier | ................... | H04W 8/005 370/329 |
| 2007/0183375 A1* | 8/2007 | Tiwari | ................... | H04L 63/101 370/338 |
| 2007/0192863 A1* | 8/2007 | Kapoor | ................... | G06F 9/505 726/23 |
| 2008/0262991 A1* | 10/2008 | Kapoor | ................... | G06F 21/55 706/20 |
| 2011/0078793 A1* | 3/2011 | Orgill | .................. | H04L 63/1466 726/23 |

(Continued)

OTHER PUBLICATIONS

Jana, et al. (2010) "On fast and accurate detection of unauthorized wireless access points using clock skews." *IEEE Transactions onMobile Computing*, vol. 9(3):449-462.

(Continued)

*Primary Examiner* — Farid Homayounmehr
*Assistant Examiner* — Thanh T Le
(74) *Attorney, Agent, or Firm* — Harness, Dickey & Pierce, P.L.C.

(57) ABSTRACT

A terminal which selects an access point (AP) and a method thereof are provided. The method for selecting the AP includes: receiving a plurality of packets from a plurality of APs which provide wireless communication services, analyzing the received plurality of packets and calculating reliability for security of the plurality of APs, and displaying the calculated reliability and identification information of the plurality of APs.

8 Claims, 5 Drawing Sheets

(56) References Cited

U.S. PATENT DOCUMENTS

2011/0222421 A1\* 9/2011 Jana ................ H04W 12/12
370/252
2011/0231564 A1\* 9/2011 Korsunsky ............ G06F 21/55
709/231

OTHER PUBLICATIONS

Peng, et al. (2010) "The intrusion detection system design in WLAN based on rogue AP." *2010 2nd International Conference Computer Engineering and Technology (ICCET)*, vol. 3:V3-432-V3-436.
International Search Report (ISR) in PCT/KR2011/010409, dated Sep. 3, 2012.

\* cited by examiner

METHOD FOR SELECTING ACCESS POINT WITH RELIABILITY

CROSS-REFERENCE TO RELATED APPLICATIONS

This application is a national phase application of PCT Application No. PCT/KR2011/010409, filed on Dec. 30, 2011, which claims the benefit and priority to Korean Patent Application No. 10-2011-0109134, filed Oct. 25, 2011 and Korean Patent Application No. 10-2010-0138873, filed Dec. 30, 2010. The entire disclosures of the applications identified in this paragraph are incorporated herein by references.

FIELD

Apparatuses and methods consistent with the exemplary embodiments relate to a terminal and a method thereof, and more particularly, to a terminal which can collect a fake access point (AP) and a method thereof.

BACKGROUND

3rd Generation (3G) is a communication method that provides a wireless Internet service through a base station, and wireless fidelity (Wi-Fi) is a communication method that provides a wireless Internet service using an access point (hereinafter, referred to as an AP). Portable terminals such as smartphones and tablet PCs are able to use wireless Internet services using the 3G or Wi-Fi in any time and place. However, in the case of the 3G, users should pay for the use of the Internet, and, in the case of the Wi-Fi, users are free to use the Internet. In recent years, many open places such as public places are providing the Wi-Fi service.

However, the 3G provides a safe Internet service from the perspective of security, whereas the Wi-Fi uses the AP to provide the Internet service and thus does not guarantee high reliability about security of portable terminals.

For example, if an attacker such as a hacker disguises its terminal as an AP, it is difficult for a portable terminal to recognize that the AP is the attacker's terminal. Therefore, the portable terminal may access such an AP. In this case, the attacker may steal information stored in the portable terminal from the user of the portable terminal. Therefore, there is a need for a method for distinguishing between an attacker terminal which is disguised as an AP (hereinafter, referred to as a "fake AP"), and a real AP.

SUMMARY

One or more aspects of the exemplary embodiments provide a terminal which can collect a fake AP, a server, and a method thereof.

One or more aspects of the exemplary embodiments also provide a terminal which can calculate reliability on each of a plurality of APs and distinguish between a fake AP and a non-fake AP based on the reliability, and a method thereof.

One or more aspects of the exemplary embodiments also provide a recording medium on which a program for a terminal to calculate reliability on each of a plurality of APs and distinguish between a fake AP and a non-fake AP based on the reliability is recorded.

According to an aspect of an exemplary embodiment, there is provided a method for selecting an AP, the method including: receiving a plurality of packets from a plurality of APs which provide wireless communication services; and analyzing the received plurality of packets and selecting a fake AP.

According to one or more exemplary embodiments, it is possible to select an AP having aggression (fake AP) such as hacking from among a plurality of APs existing nearby. The user may prevent personal information leakage using a list of selected fake APs.

BRIEF DESCRIPTION OF THE DRAWINGS

The above and other features and advantages will become more apparent by describing in detail exemplary embodiments with reference to the attached drawings in which.

<Description of the reference numerals in the drawings>

| | |
|---|---|
| 10, 20, 30: first to third APs | |
| 100, 110, 120, and 130: first to fourth terminals | |
| 110: touch screen | 120: storage |
| 130: communicator | 140: fake AP selector |
| 150: controller | |

DETAILED DESCRIPTION

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art. It will be understood that when an element is referred to as being "on" another element, the element can be directly on another element or intervening elements.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

In the description of the exemplary embodiments, an attacker terminal and a fake AP are interchangeably used unless there is profit in distinguishing them.

Figure 1:
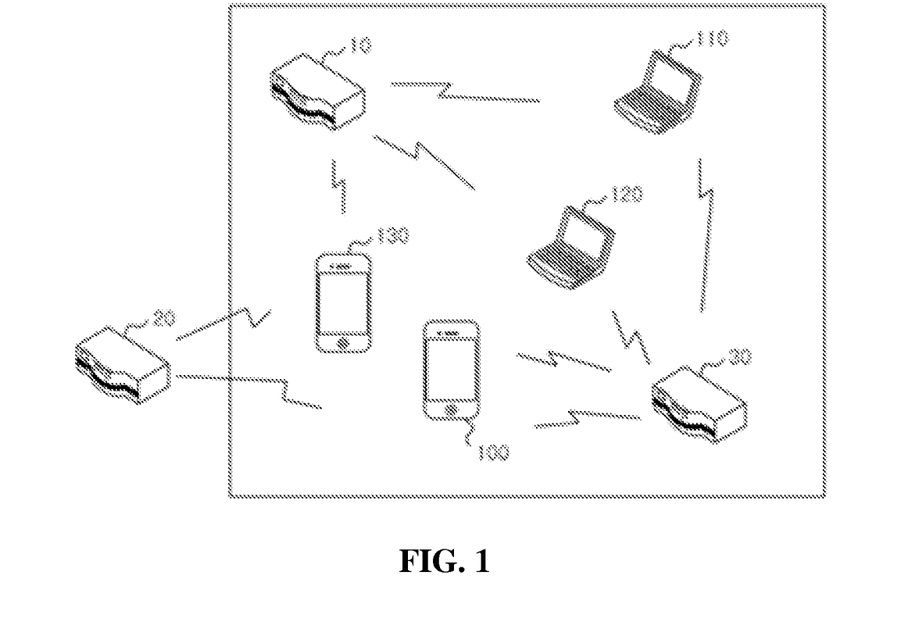
FIG. 1 is a view illustrating a wireless communication system which includes a terminal according to an exemplary embodiment.

FIG. 1 is a view illustrating a wireless communication system which includes a terminal according to an exemplary embodiment.

FIG. 1 is a view illustrating a wireless communication system which includes a portable terminal having a firewall according to an exemplary embodiment.

Referring to FIG. 1, the wireless communication system includes first to third APs 10, 20, and 30, and first to fourth portable terminals 100, 110, 120, and 130. The number of APs and the number of portable terminals recited herein are merely examples and the exemplary embodiments should not be limited to the numbers presented herein.

The first to third APs 10, 20, and 30 are devices that provide wireless communication services to nearby terminals, and may be wire or wireless routers (hereinafter, referred to as "wire/wireless routers") for example. The first to third APs 10, 20, and 30 broadcast packets indicating their respective existences providing wireless communication services. At this time, each packet which is broadcasted includes a media access control (MAC) address and a service set identifier (SSID) in its header. The MAC address is a unique address that is assigned to each of the first to third APs 10, 20, and 30 for wireless communication, and the SSID is a name of a wireless local area network (LAN) service that is provided by each of the first to third APs 10, 20, and 30.

The MAC address varies from AP to AP. However, the SSID may vary from AP to AP or may be the same. The SSID that can be commonly seen in Korea may be "iptime", "u+zone", "myLGnet", and etc.

The first and second portable terminals 100 and 130 may provide various functions such as voice call, retrieving information through the Internet, receiving and transmitting materials through wire/wireless communication, receiving and transmitting fax, and scheduling. The first and second portable terminals 100 and 130 may have an operating system (OS) mounted therein like a personal computer and may be a smartphone for example. The third and fourth terminals 110 and 120 may be tablet PCs.

It is common that the AP is an entity that connects a wireless medium and a wire network such as IEEE 802.3, serves as a base station for a wireless local area network (WLAN) device, and connects the WLAN device to a wire network such as a LAN. Such an Internet accessing method may be called Wi-Fi. On the other hand, when the AP also serves as a router, the AP supports a plurality of portable terminals to use the Internet.

In recent years, users may use free Internet services using Wi-Fi in public places such as library, office, and café. For example, if the first to third APs 10, 20, and 30 are installed, the first to fourth portable terminals 100, 110, 120, and 130 receive packets which are broadcasted by the first to third APs 10, 20, and 30, and display signal strength and an SSID of each AP.

The user may select an AP from the APs except for the AP that is selected as a fake AP from among the APs displayed on the portable terminal, and access the AP.

Figure 2:
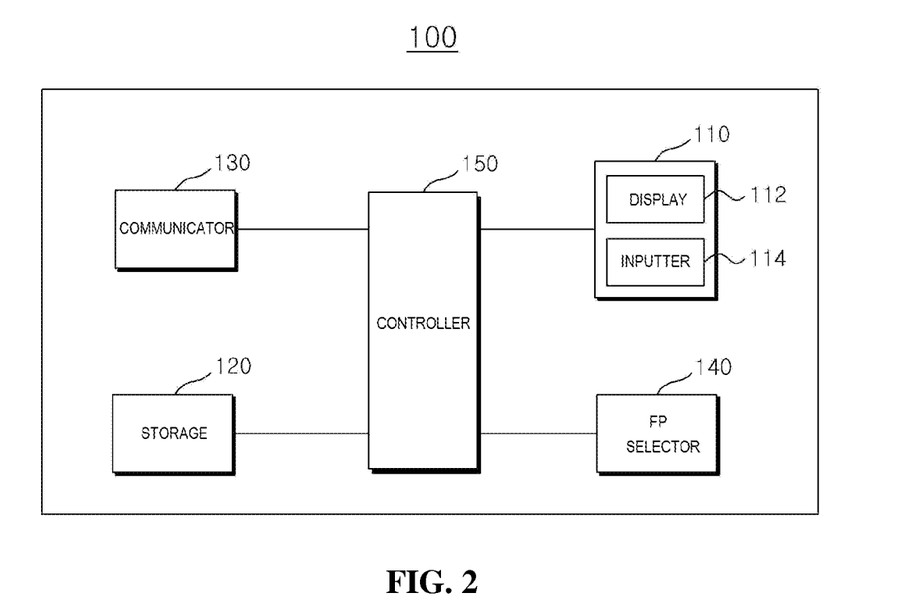
FIG. 2 is a block diagram illustrating a first terminal 100 of FIG. 1 according to an exemplary embodiment.

FIG. 2 is a block diagram illustrating the terminal 100 of FIG. 1 according to an exemplary embodiment.

Referring to FIG. 2, the first portable terminal 100 may include an inputter/outputter 110, a storage 120, a communicator 130, and an fake AP (FP) selector 140, and a controller 150.

The inputter/outputter 110 may be implemented by using a touch screen for example, and is responsible for input or output interfacing between the user and the first portable terminal 100. The user may use functions provided by the first portable terminal 100 or may be provided with the functions through the inputter/outputter 110. For example, when the inputter/outputter 110 is implemented by using a touch screen, the user may select an icon that he/she wants from among function icons displayed on the inputter/outputter 110 by touching it.

The inputter/outputter 110 may include a display 112 and an inputter 114. The display 112 may display a screen showing a current state of the first portable terminal 100, and the inputter 114 may include a touch panel or an operation panel. The first portable terminal 100 may receive a command from the user through these panels. Although the touch screen using a touch input method has been mainly described in the present exemplary embodiment, the inputter/outputter 110 may be implemented by using a display panel such as a light emitting diode (LED) or a liquid crystal display (LCD), or an input device such as a keyboard or a mouse.

The storage 120 may store programs such as a control program necessary for running the first portable terminal 100, an OS, an application, and/or a driver for running a hardware element, and may store data necessary for operations of the first portable terminal 100 and data which are generated during the running of the first portable terminal 100. The application recited herein may be downloaded through a network and installed in the portable terminals.

The storage 120 refers to a recording medium on which data and/or programs are recorded temporarily or permanently. In the present exemplary embodiment, a single storage 120 is provided. However, this is just for easy explanation of the exemplary embodiments and it should be understood by an ordinary skilled person in the related art that the storage 120 may be implemented in various forms such as in the form of a random access memory (RAM), a read only memory (ROM), and a hard disk, and the number of storages 120 may vary.

The communicator 130 may communicate with a base station (not shown) to make a call, and may communicate with an AP to receive a wireless communication service like the Internet. To achieve this, the communicator 130 may be implemented by using a module having a complex function. The communicator 130 may receive packets which are broadcasted by the APs in the proximity to the place where the portable terminal is located.

Referring to FIGS. 1 and 2, the communicator 130 may receive packets which are broadcasted by the first to third APs 10, 20, and 30.

The FP selector 140 may analyze the packets which are received from the first to third APs 10, 20, and 30, and may select (that is, identify) a fake AP. The selected fake APs may be stored in the storage 120 in the form of a list (hereinafter, a list of fake APs), but the list of fake APs may not be necessarily stored in the storage 120 and may be stored in another storage (not shown).

For example, the fake AP selector 140 analyzes at least one of a MAC address, an SSID, and reception signal strength from among data included in the packets received from the first to third APs 10, 20, and 30, and determines whether there is a fake AP from among the first to third APs 10, 20, and 30.

For example, the fake AP selector 140 may select a fake AP in the following methods.

In the first method, the fake AP selector 140 calculates reliability of each AP and then selects a fake AP based on the reliability. The reliability is an indicator indicating a probability that the first to third APs 10, 20 and 30 are fake APs. The AP that has lowest reliability or reliability lower than a specific value may be selected as a fake AP.

In the second method, the fake AP selector 140 analyzes the packets which are received from the first to third APs 10, 20, and 30, and, when the packets are in a specific situation, selects a fake AP. In the second method, information on a fake AP may be stored in advance and a fake AP is selected based on the information.

$1^{ST}$ Situation

The 1st situation is a case in which the SSID is different but the MAC address is the same.

For example, the fake AP selector 140 may analyze MAC addresses and SSIDs which are included in the packets received from the first to third APs 10, 20, and 30, and may select a fake AP from among the first to third APs 10, 20, and 30.

For example, the fake AP selector 140 may select APs that have different SSIDs, but have the same MAC address from among the first to third APs 10, 20, and 30 as fake APs.

When two APs have different SSIDs but have the same MAC address, the two APs are not separate devices but is a single device. Therefore, there is a high probability that such APs are attacker's terminals.

When the first AP 10 is in the first situation, the fake AP selector 140 may select the first AP 10 as a fake AP.

Even when the AP is in the first situation, the fake AP selector 140 may determine a fake AP by considering at least one of other situations, which will be described below. For example, when a value is assigned to each situation and a sum of those values is greater than a predetermined value, the fake AP selector 140 may select a corresponding AP as a fake AP.

$2^{ND}$ Situation

The 2nd situation is a case in which APs have different SSIDs and different MAC addresses, but reception signal strengths of packets of the APs are equal or similar to one another.

The fake AP selector 140 may check signal strengths of packets which are broadcasted by the APs and may find a fake AP. Even when the APs have different SSIDs and different MAC addresses, the APs may be fake APs. That is, the fake AP may broadcast packets of a different MAC address and a different SSID. In this case, the fake AP cannot be selected only by the MAC address and the SSID. To solve this problem, the fake AP selector 140 determines whether signal strengths of packets are equal or similar to one another, and selects a fake AP if the signal strengths of the packets are equal or similar to one another.

For example, it is assumed that the first AP and the second AP have different MAC addresses and different SSIDs. In this case, the fake AP selector 140 compares signal strength of the first AP and signal strength of the second AP, and determines whether they are equal or similar to each other. When it is determined that the signal strengths are equal or similar to each other, the first AP and the second AP are actually the same terminal and there is a high probability that the first and second APs are fake APs. Then, the fake AP selector 140 may select the first AP and the second AP as fake APs.

In the above-described exemplary embodiment, it is the fake AP selector 140 that compares the signal strengths of the APs. However, this is merely an example and a separate element other than the fake AP selector may be provided to compare the signal strengths of the APs.

By squaring a signal value of each AP for a predetermined time period, and determining whether the signal strengths are equal to one another, the signal strengths of the APs are compared. Of course, this method is merely an example and another algorithm may be used to determine whether the signal strengths of the APs are equal or similar to one another.

$3^{RD}$ Situation

The 3rd situation is a case in which APs have the same MAC address and their packets have the same reception signal strength.

The fake AP selector 140 may detect packets that have the same MAC address from among data included in the packets received from the first to third APs 10, 20, and 30, and may select the APs that have transmitted the packets having the same reception signal strength from among the detected packets as fake APs.

$4^{TH}$ Situation

The 4th situation is a case in which APs have different SSIDs and their packets have the same signal strengths.

The fake AP selector 140 analyzes MAC addresses, SSIDs, and reception signal strengths from among data included in the packets received from the first to third APs 10, 20, and 30, and selects the APs that have different SSIDs, but have transmitted packets having the same signal strength as fake APs.

$5^{TH}$ Situation

The 5th situation is a case in which an AP has a MAC address without a manufacturer.

The fake AP selector 140 analyzes the packets which are received from the first to third APs 10, 20, and 30, and selects the AP that has a MAC address not assigned to a manufacturer as a fake AP. Since modern manufacturers disclose an object identifier (OID) in recent years, the fake AP selector 140 compares an OID included in the MAC address and the OIDs disclosed by the manufacturers, thereby selecting the AP that has no manufacturer. Although not shown, a server to store the OID disclosed by the manufacturers may be separately provided. The first terminal 100 may obtain the OIDs of the manufacturers from the server in which such an OID is stored.

$6^{TH}$ Situation

The 6th situation is a case in which a portable AP is provided.

The fake AP selector 140 analyzes packets and selects a portable AP as a fake AP. It is determined whether an AP is a portable AP or not using a MAC address. Since it is common that a MAC address has information indicating a manufacturer, it is determined whether the AP is a portable AP or not using such information. To achieve this, the storage 120 may store information on a list of AP manufacturers. The list of AP manufacturers contains a manufacturer of each AP and indicates whether each manufacturer is manufacturing only a portable AP or does not manufacture a portable AP. For example, when the MAC address is AA:BB:CC:DD:EE:EF, AA:BB:CC is information distinguishing between manufacturers and is called an organizationally unique identifier (OUI).

$7^{TH}$ Situation

The 7th situation is a case in which an AP uses 3G or 4G at a back end.

The fake AP selector 140 may distinguish the AP that uses 3G or 4G from other APs, and may select it as a fake AP.

It is common that APs use Ethernet at a back end. However, there may be APs that use 3G or 4G. However, when the AP uses 3G or 4G at the back end, it costs much and a communication speed is low. Since there is less reason to use 3G and 4G, the APs that use 3G and 4G are more likely to be fake APs. Accordingly, the fake AP selector 140 according to the exemplary embodiment may select the APs that use 3G and 4G as fake APs.

There are many methods for selecting APs that use 3G and 4G. For example, the following method may be used.

The fake AP selector 140 finds a routing path, thereby finding whether the AP uses 3G or 4G at the back end. For example, the fake AP selector 140 may find the routing path using an Internet control message protocol (ICMP).

The fake AP selector 140 may directly find the routing path like this, and alternatively, may call the OS of the terminal 100 and control the OS to find the routing path. When the OS finds the routing path using the ICMP, the OS notifies the fake AP selector 140 of a result.

The OS may be stored in the storage 120 or another storage (not shown), and may be loaded into a memory and operated.

Figure 5:
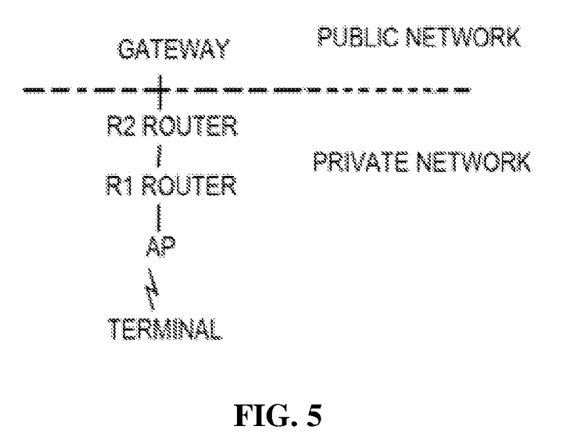
FIG. 5 is a block diagram to illustrate an operation of a terminal according to an exemplary embodiment.

FIG. 5 is a block diagram to illustrate an operation of a terminal according to an exemplary embodiment. Referring to FIG. 5, a method for finding a routing path using the ICMP will be explained.

When the fake AP selector 140 transmits an ICMP trans routing message to an AP, the AP informs the terminal of its own AP address and routers R1 and R2 connected to the AP inform the terminal 100 of their own IP addresses. On the other hand, a gateway informs the terminal 100 of its own IP address. The terminal 100 may know whether the back end uses 3G or 4G with reference to the IP address of the gateway.

The above-described method for selecting the AP that uses 3G or 4G at the back end is merely an example and the exemplary embodiments should not be considered as limited to this method.

$8^{TH}$ Situation

The 8th situation is a case in which an AP has a routing path different from a pre-stored routing path.

The fake AP selector 140 may select the AP that has a routing path different from a pre-stored routing path as a fake AP. To achieve this, the storage 120 may store a routing path of each AP. The terminal 100 may find the routing path by using the ICMP as described above.

$9^{TH}$ Situation

The 9th situation is a case in which at least one AP from among APs that the terminal have accessed previously has the same SSID and the same routing path as those of a currently scanned AP, or has the same SSID, the same routing path, and the same authentication algorithm as those of the currently scanned AP.

A specific type of terminals may automatically access the AP that they have accessed once.

For example, when a specific type of terminal wants to use a wireless Internet service in a predetermined place, it scans APs located nearby and finds APs that it can access. When there is an AP that i) has the same SSID or that ii) has the same SSID and the same authentication algorithm as those of the AP that the terminal has accessed previously from among the found APs, the terminal automatically access the AP without asking the user of the terminal about whether to access the AP. The fake AP may use such a weak point.

According to the exemplary embodiment, the terminal 100 may store a routing path of each of the APs that the terminal 100 has accessed previously more than 2 hops in order to select such a fake AP. The storage 120 may store the routing path of each AP more than 2 hops. Also, according to the exemplary embodiment, the terminal may store the SSID and the authentication algorithm of each of the APs that the terminal has accessed previously in the storage 120.

For example, when the terminal 100 tries to access one of the APs scanned in a current location, the terminal 100 identifies the SSIDs and the authentication algorithms of the scanned APs. The terminal 100 compares the SSIDs and the authentication algorithms with the SSIDs and the authentication algorithms of the APs that the terminal has accessed previously and that are stored.

The terminal 100 determines whether there is an AP that i) has the same SSID as that of the AP that the terminal 100 has accessed previously (hereinafter, referred to as the 'previously accessed AP'), or that ii) has the same SSID and the same authentication algorithm as those of the previously accessed AP from among the APs scanned in the current location (for convenience of explanation, the AP that corresponds to the case i) or ii) will be referred to as a "i)ii)_AP").

When there is a i)ii)_AP from among the APs scanned in the current location, the terminal 100 identifies a routing path of the i)ii)_AP.

That is, the terminal 100 identifies whether the routing path of the i)ii)_AP is the same as that of the previously accessed AP stored in the storage 120, and, if the routing paths are not the same, determines the i)ii)_AP as a fake AP.

In the above-described exemplary embodiment, the operations of comparing the SSID and the authentication algorithm and identifying the routing path may be directly performed by the fake AP selector 140.

Alternatively, the fake AP selector 140 may call the OS of the terminal 100 and may control the OS to find the routing path of the i)ii)_AP. The OS may find the routing path of the i)ii)_AP and may inform the fake AP selector 140 of the routing path.

The fake AP selector 140 or the OS may store the SSID, the authentication algorithm, and the routing path of the AP every time that the terminal accesses the AP.

Although the terminal stores the SSID, the authentication algorithm, and the routing path of the AP that the terminal has accessed in the storage 120 in the above-described exemplary embodiment, the terminal may store them in different storages separately. The different storages (not shown) may be included in the terminal 100 or may be devices connected with the terminal 100 through communication (for example, a device providing a storage device through a network such as a cloud server or a web hard).

$10^{TH}$ Situation

The 10th situation is a case in which an AP encrypts in a predetermined time order.

The fake AP selector 140 may select a fake AP from among scanned APs by considering a temporal variation in encryption methods of the scanned APs.

For example, there are four encryption methods, OPEN, WEP, WPA, and WPA2, and a degree of encryption increases in order of OPEN<WEP<WPA<WPA2.

For example, when the first AP changes the encryption method from WPA2 to WEP, the fake AP selector 140 may select the first AP as a fake AP. That is, when the encryption method changes from a high degree to a low degree with time, the AP may be selected as a fake AP.

The fake AP selector 140 may store a change in the encryption methods of the APs scanned in the current location in a memory (not shown) of the terminal 100.

$11^{th}$ Situation

The 11 situation is a case in which an AP is included in a pre-stored black list or white list.

The storage 120 may store a black list or a white list on SSIDs, and the fake AP selector 140 may select a fake AP using such a list. For example, when the black list includes an SSID of a specific AP, the specific AP is selected as a fake AP, and, when the white list includes an SSID of a specific AP, the specific AP is selected as a fake AP.

$12^{TH}$ Situation

The 12th situation is a case in which an AP has a hidden SSID.

The fake AP selector 140 treats an AP that has a hidden SSID as a fake AP. Alternatively, even when the AP has a hidden SSID, the fake AP selector 140 does not directly treat the AP as a fake AP and selects a fake AP by considering other situations.

13th Situation

The 13th situation is a case in which there are APs that use the same channel.

When there are many APs that use the same channel, the fake AP selector may select those APs as fake APs. It is common that APs use a channel of a specific band, but fake APs are more likely to use a channel of the same band. Therefore, when there are many APs that use a channel of the same band in a specific region, there is a high probability that all of the APs using the same band are fake APs. Alternatively, even the APs that use the same channel may not be directly treated as fake APs and a fake AP is selected by considering other situations.

14th Situation

The 14th situation is a case in which locations of APs are changed with time more than a predetermined reference number of times.

The fake AP selector 140 may select a fake AP with reference to location history of APs which changes with time. For example, the first portable terminal 100 may track a location value of each AP and may store it in a memory (not shown) or the storage 120 according to a time zone. The fake AP selector 140 may determine whether the AP is a fake AP or not with reference to a result of the tracking.

15th Situation

The 15th situation is a case in which a MAC address corresponds to an address of a manufacturer of a smartphone (or a laptop computer).

The fake AP selector 140 checks whether a MAC address included in the packets received from the first to third APs 10, 20, and 30 is a MAC address of a manufacturer of a smartphone (or a laptop computer), and, when the MAC address is the MAC address of the manufacturer of the smartphone (or the laptop computer0, selects the AP as a fake AP.

When an AP corresponds to a specific situation from among the above-described first to fifth situations, the fake AP selector 140 may select the AP as a fake AP without considering the other situations. For example, since an AP corresponding to the first situation is more likely to be an attacker, the AP corresponding to the first situation is selected as a fake AP.

For another example, an AP that is included in the black list may be selected as a fake AP. On the other hand, an AP that is included in the white list may not be selected as a fake AP.

When an AP corresponds to a plurality of situations from among the 1st to 15th situations described above, the fake AP selector 140 applies a pre-set weight to each situation, calculates reliability and determines a fake AP according to the reliability.

For example, it is assumed that the first to third APs 10, 20, and 30 have different SSIDs and different MAC addresses, but the first AP 10 and the second AP 20 have the same reception signal strength. When packets have different SSIDs and different MAC addresses, but have the same reception signal strength, the packets are likely to be broadcasted from the same place. Therefore, there is a probability that the first AP 10 and the second AP 20 are attacker's terminals.

In this case, the fake AP selector 140 calculates reliability of the first AP 10 and the second AP 20 lower than that of the third AP 30.

The method for calculating reliability by the fake AP selector 140 may be one of the following methods.

The first method is to divide the reliability into high, medium and low grades according to the 1st to 15th situations. For example, when an AP corresponds to the 1st situation, the fake AP selector 140 always calculates reliability of 'not recommended' regardless of whether the AP corresponds to other situations. For another example, when an AP corresponds to the 2nd situation and 5th situation, the reliability is calculated as 'not recommended'. For still another example, if an AP does not correspond to any situation, the reliability is calculated as 'recommended'. In this method, an ordinary skilled person in the related art may assign grades appropriately by combining the 1st to 15th situations.

TABLE 1

| Reliability (Grade) | Situations |
|---|---|
| High (recommended, safe) | An AP is included in a white list in the 10th situation |
| | An AP does not correspond to any of the 1st to 15th situations |
| Medium (normal) | An AP corresponds to only the 4th situation |
| Low (not recommended, danger) | An AP corresponds to the 1st situation; |
| | An AP corresponds to at least three situations of the 1st to 15th situations; and |
| | An AP is included in a black list in the 10th situation. |

Table 1 is merely an example and assigns grades to only some situations for example. The fake AP selector 140 may determine which situation APs scanned around the terminal 100 correspond to from among the 1st to 15th situations, and may calculate reliability with reference to table 1 delineating reliability according to situations.

The second method is to mathematically calculate a degree of corresponding to the 1st to 15th situations, find a grade corresponding to the degree, and assign reliability. For example, the fake AP selector 140 may calculate M using the following equation and may calculate reliability with reference to table 2:

$$M = (A \times X) + (B \times Y) + (C \times Z) + (D \times W)$$

The above equation considers only the 1st to 4th situations for convenience of explanation, and X, Y, Z, and W are values corresponding to the 1st, 2nd, 3rd, and 4th situations, respectively, and A, B, C, and D are weights assigned to respective situations.

For example, X is 0 when X corresponds to the 1st situation and is 25 when X does not correspond to the 1st situation. Y is 0 when Y corresponds to the 2nd situation and is 25 when Y does not correspond to the 2nd situation.

For example, A, B, C and D may be assigned 2, 1.5, 1.2, and 1.7.

TABLE 2

| Reliability (Grade) | M value |
|---|---|
| High (recommended, safe) | More than 90 |
| Medium (normal) | More than 60 and less than 90 |
| Low (not recommended, danger) | Less than 60 |

The above-presented numerical values are merely an example and exemplary embodiments are not limited to those values.

The controller 150 may control the operation of the first portable terminal 100 using a control program, an OS, and an application which are stored in the storage 120. For example, when the user selects one of a plurality of applications through the inputter 114, the controller 150 may run the selected application and may display a corresponding screen on the display 112.

Also, when the user requests a wireless communication service, the controller 150 controls the communicator 130 to receive packets from nearby APs, for example, from the first to third APs 10, 20, and 30, and controls the fake AP selector 140 to analyze the packets received through the communicator 130, to calculate reliability of each of the first to third APs 10, 20, and 30, and select a fake AP according to the reliability.

When the reliability is calculated by the fake AP selector 140, the controller 150 generates a screen showing the calculated reliability, whether the AP is a fake AP or not, and identification information of each AP (for example, an SSID), and controls the display 112 to display the generated screen. Accordingly, the user may easily distinguish a danger AP from among the first to third APs 10, 20, and 30, and prevent danger related to security.

When the fake AP selector 140 finds APs using the same MAC address (for example, the first AP 10), the controller 150 defines the APs as being danger; when a manufacturer of the MAC is known like Samsung or LG, the controller 150 defines the first AP 10 as a smartphone and as being danger; when the MAC address is not registered according to the OUI standard, the controller 150 defines the first AP 10 as being suspected; and, when APs have different MAC addresses, but have the same signal strength, the controller 150 defines the A Pas being suspected. The controller 150 generates a screen showing the above-described information and displays the screen on the display 112.

When the reliability is calculated in the above-described method and it is determined whether the AP is the fake AP, the controller 150 generates a screen showing the calculated reliability, whether the AP is the fake AP, and identification information of each AP (for example, an SSID), and displays the screen on the display 112.

Although the storage 120 stores all of the control program, the OS, and the application in the above-described exemplary embodiment, this is merely an example. The control program, the OS, and the application may be stored in separate storages. For example, a storage to store the control program and the OS and a storage to store the application may be separately provided. The control program, the OS, and the application may be loaded into a volatile storage (not shown) such as a random access memory (RAM) when they are run. This is a well known method and thus is not described in detail.

Figure 3:
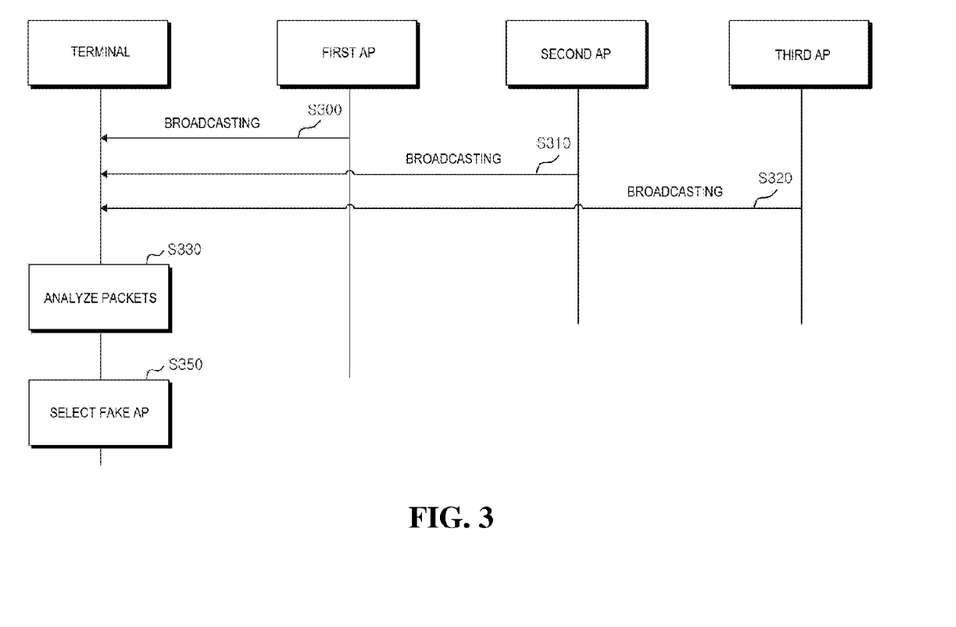
FIG. 3 is a flowchart to illustrate a method for selecting an AP of a terminal according to an exemplary embodiment.

FIG. 3 is a flowchart to explain a method for selecting an AP of a terminal according to an exemplary embodiment.

A terminal to perform the method for selecting the AP of FIG. 3 may be the first terminal 100 explained above with reference to FIG. 2 or may be an application and/or a hardware element installed in the first terminal 100.

In operations S300 to S320, the first to third APs each broadcast at least one packet to inform about their existences providing wireless communication services.

In operation S330, the terminal, which is requested to scan ambient radio signals, analyzes the received packets and calculates reliability of each of the first to third APs.

In operation S350, the terminal selects a fake AP based on the reliability calculated in operation S330.

Figure 4:
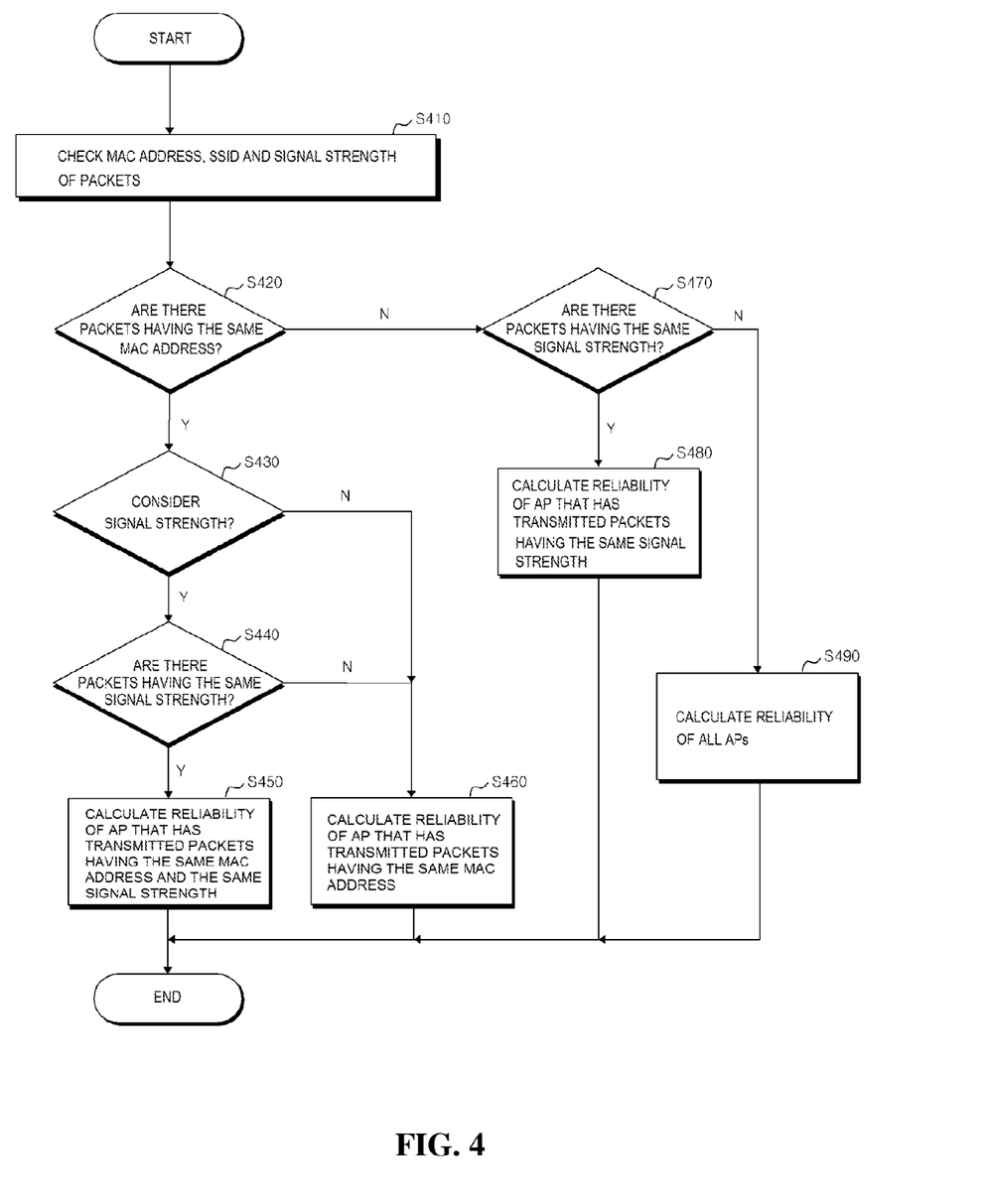
FIG. 4 is a flowchart to illustrate operation S330 of FIG. 3 in detail.

FIG. 4 is a flowchart to illustrate operation S330 of FIG. 3 in detail.

In operation S410, the terminal checks MAC addresses, SSIDs, and reception signal strengths included in the received packets.

In operation S420, the terminal checks whether there is the same MAC address from among the checked MAC addresses.

When it is determined that there is the same MAC address (S420-Y), the terminal may determine whether to further consider the reception signal strength in operation S430.

When it is determined that the reception signal strength is further considered (S430-Y), in operation S440, the terminal checks whether there are packets having the same reception signal strength from among the packets which are determined as having the same MAC address in operation S420.

When it is determined that there are packets having the same reception signal strength (S440-Y), the terminal calculates reliability of the AP that has transmitted the packets having the same signal strength from among the packets having the same MAC address, that is, the first AP. At this time, the lowest reliability of the first AP may be calculated. This is because the same MAC address and the same signal strength of the packets indicate that the plurality of packets are broadcasted from the first AP, and thus, there is a high probability that the first AP is a fake AP.

When it is determined that the reception signal strength is not further considered (S430-N), the terminal calculates reliability of the AP which has transmitted the packets determined as having the same MAC address in operation S420, that is, the first AP in operation S460. At this time, low reliability of the first AP may be calculated. This is because the same MAC address of the packets indicates that the plurality of packets are broadcasted from the first AP and thus there is a high probability that the first PA is a fake AP.

When there is no same MAC address (S420-N), in operation S470, the terminal may check whether there are packets having the same signal strength from among the packets checked in operation S410.

When there are packets having the same signal strength (S470-Y), the terminal calculates reliability of the first AP that has transmitted packets having the same signal strength from among the packets having the same MAC address, in operation S480. At this time, low reliability of the first AP may be calculated. This is because the same reception signal strength indicates that the plurality of packets are broadcasted from the first AP even if the MAC addresses and the SSIDs of the packets are not the same, and thus there is a high probability that the first AP is a fake AP.

On the other hand, when there is no packet having the same signal strength (S470-N), the terminal determines that there is no fake AP nearby and calculate reliability of all of the first to third APs which have broadcasted packets in operation 5490.

In the above-described exemplary embodiment, the fake AP selector may select the fake AP and also calculate reliability of the AP. However, this is merely an example a separate element to select the fake AP may be provided and the fake AP selector may calculate the reliability.

As another method for selecting a fake AP, a finger printing method may be provided. This method examines all of the channel (frequency band), assigned IP, SSID, MAC address, and authentication method.

For example, a fake AP may interrupt when the terminal communicates with a normal AP. In this case, the fake AP may be determined in the finger printing method. Specifically, the terminal may receive two finger printings. That is, the terminal may receive a finger printing (SSID, BSSID, authentication method, and channel) from an AP 'A' prior to accessing the AP 'A', and receives the finger printing (SSID, BSSID, authentication method, channel, and routing path-k hop) after accessing the AP 'A'. The finger printing received prior to the terminal accessing the AP 'A' is to determine whether the AP 'A' is normal or not, and the finger printing received after the terminal accesses the AP 'A' is to detect a fake AP which interrupts when the terminal communicates with the AP 'A'.

The finger printing method may be combined with the exemplary embodiments described above with reference to FIGS. 1 to 5. That is, the finger printing method may be combined with the above-described 1st to 15th situations and may determine whether there is a fake AP.

Figure 6:
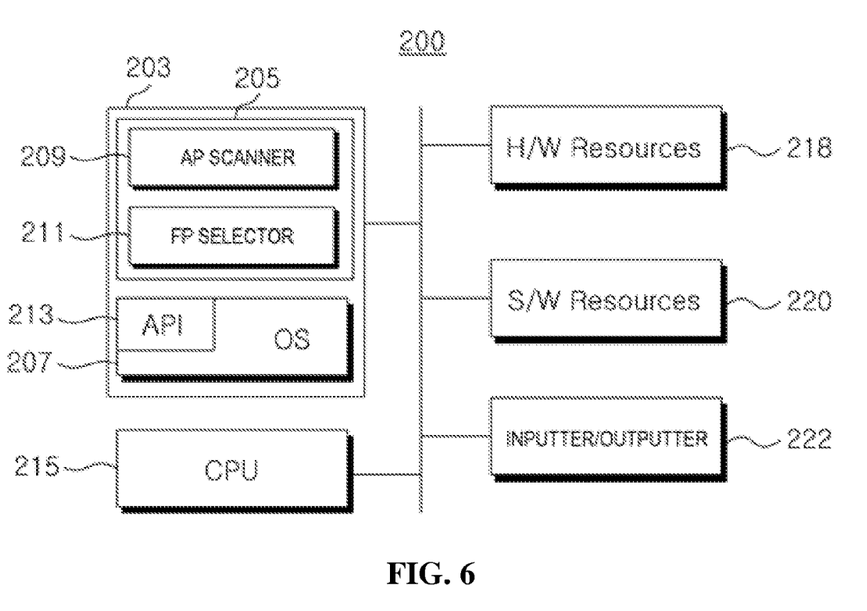
FIG. 6 is a block diagram of a terminal 200 according to another exemplary embodiment.

FIG. 6 is a block diagram illustrating a terminal 200 according to another exemplary embodiment.

Referring to FIG. 6, the terminal 200 may include a memory 203, a CPU 215, hardware resources 218, software resources 220, and an inputter/outputter 222.

An application 205 and an OS 207, which provide reliable AP information, may be loaded into the memory 203 under the control of the CPU 215.

The hardware resources 218 and the software resources 220 refer to hardware and software resources that are necessary for operations of the terminal 200, and in particular, refer to hardware and software resources that are necessary for operations of the application 205, the OS 207, the memory 203, and the CPU 215.

The OS 207 may be stored in a hard disk which is one of the hardware resources 218, and, when the terminal 200 is turned on, the OS 207 may be loaded into the memory 203 under the control of the CPU 215 and operated.

The application 205 may be stored in the hard disk, which is one of the hardware resources 218, and may be loaded into the memory 203 under the control of the CPU 215 according to A user's request.

The application 205 may include an AP scanner 209 and a fake AP selector 211.

The AP scanner 209 collects AP packets that exist in the proximity to the terminal 200, and provides SSIDs and MAC addresses to the fake AP selector 211. For example, the AP scanner 209 may call an API 213 of the OS 207 and may instruct the API 213 to collect the AP packets existing around the terminal 200. The API 213 may directly perform the operation according to the instruction of the AP scanner 209, or may call other functions or procedures of the OS 207 to perform the operation according to the instruction of the AP scanner 209. The API 213 may provide a result to the AP scanner 209 or the fake AP selector 211.

The fake AP selector 211 may perform the operation that is performed by the fake AP selector 140 in FIGS. 1 and 2.

As the fake AP selector 140 finds the routing path as described in the above exemplary embodiment of FIG. 2, the fake AP selector 211 may also find a routing path. For example, the fake AP selector 211 may call the API 213 and instruct the API 213 to find routing paths of the APs scanned by the AP scanner 205. The API 213 may directly find the routing path according to the instruction or may call another function or procedure belonging to the OS and find the routing path, and may provide a result to the fake AP selector 211.

Alternatively, a separate routing path grasper (not shown) rather than the fake AP selector 211 may be included in the application 205 to find the routing path. For example, the routing path grasper may directly find an IP address or may find the IP address by calling the API 213.

Also, as the fake AP selector 140 finds the IP address of the routers as described in the exemplary embodiment of FIG. 2, the fake AP selector 211 also finds the IP address. For example, the fake AP selector 211 may call the API 213 and instruct the API 213 to find the IP addresses of the routers existing in the routing paths of the APs scanned by the AP scanner 205. The API 213 may directly find the IP addresses according to the instruction or may call another function or procedure belonging to the OS and find the IP addresses, and may provide a result to the fake AP selector 211.

Alternatively, a separate "IP address grasper" rather than the fake AP selector 211 may be included in the application 205 to find the IP addresses. For example, the IP address grasper may directly find the IP addresses or may find the IP addresses by calling the API 213.

The inputter/outputter 222 may perform an operation which is equal or similar to that of the element using reference numerals 110 in FIG. 2, and thus a detailed description thereof is omitted.

In the exemplary embodiment of FIG. 6, the terminal 200 may download the application 205 from an external server through the Internet and may store the application 205 in THE hard disk, which is one of the hardware resources 218.

The OS 207 may make the application 205, which is downloaded from the external server in the hard disk, stored in an executable state, and may display an icon to run the application 205 through the inputter/outputter 222 when the application 205 is executable. For example, the OS 207 may provide icons of applications which are executable in the terminal 200 on a screen for the user, and the user may execute an application by selecting the icon.

According to an exemplary embodiment, the application 205 may be executed according to a user's command or may be automatically executed without a user's command.

The application 205 may further include an element (not shown) to continuously store a list of fake APs which are selected from among the APs scanned by the AP scanner 209, and a list of non-fake APs.

According to an exemplary embodiment, the hardware resources 218 may include a hard disk which stores the list of fake APs and/or the list of non-fake APs.

When there is a request periodically or from an external server, the application 205 may transmit the list of fake APs and/or the list of non-fake APs to the external server.

Figure 7:
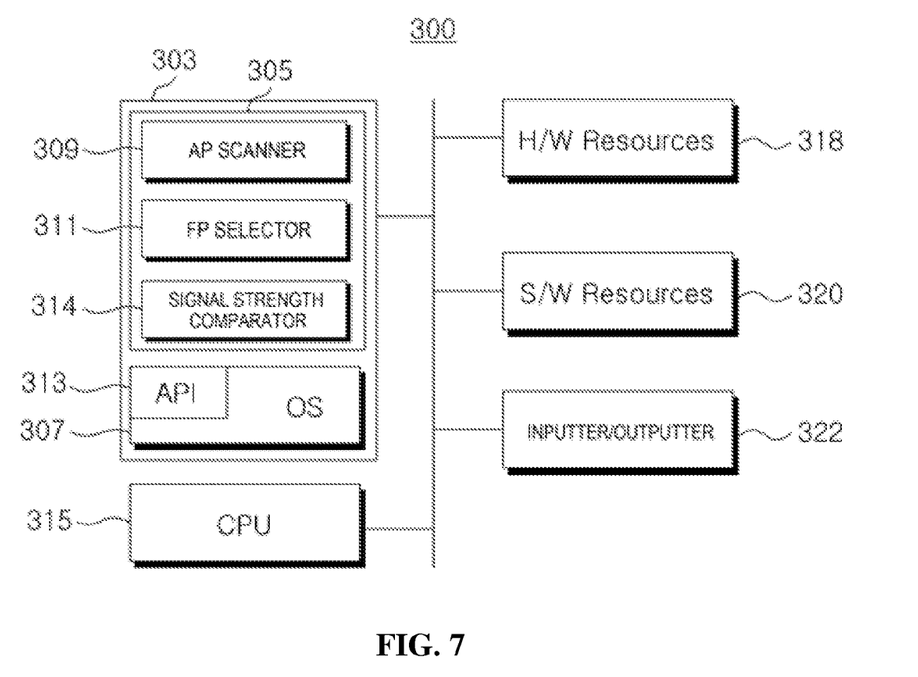
FIG. 7 is a block diagram of a terminal 300 according to still another exemplary embodiment.

FIG. 7 is a block diagram illustrating a terminal 300 according to still another exemplary embodiment.

Referring to FIG. 7, the terminal 300 may include a memory 303, a CPU 215, hardware resources 318, software resources 320, and an inputter/outputter 322.

An application 305 and an OS 307, which provide reliable AP information according to an exemplary embodiment, may be loaded into the memory 303 under the control of the CPU 307.

The hardware resources 318 and the software resources 320 refer to hardware and software resources necessary for the operation of the terminal 300, and in particular, refer to hardware resources and software resources necessary for the operations of the application 305, the OS 307, the memory 303, and the CPU 315.

The exemplary embodiment of FIG. 7 is different from the exemplary embodiment of FIG. 6 in that the application 305 includes a signal strength comparator 314. Therefore, the signal strength comparator 314 will be mainly described and an explanation of the other elements is omitted. This is because the other elements are equal or similar to those of FIG. 6 in their functions.

A fake AP selector 311 performs the same operation as that of the fake AP selector 140 of FIGS. 1 and 2. However, in the exemplary embodiment of FIG. 7, the signal strength comparator 314 rather than the fake AP selector 311 compares reception signal strengths of the packets which are received from the APs scanned by an AP scanner 305, and may provide a result to the fake AP selector 311.

The fake AP selector 311 may also find a routing path. For example, the fake AP selector 311 may call an API 313 and instruct the API 313 to find routing paths of the APs scanned by the AP scanner 305. The API 313 may directly find the routing paths based on the instruction or may call another function or procedure belonging to the OS and find the routing paths, and may provide a result to the fake AP selector 311.

Alternatively, a separate "routing path grasper" (not shown) rather than the fake AP selector 311 may be included in the application 305 to find the routing paths. For example, the routing path grasper may directly find the IP addresses or may find the IP addresses by calling the API 313.

Also, as the fake AP selector 140 finds the IP addresses of routers in the exemplary embodiment of FIG. 2, the fake AP selector 311 may also find the IP addresses. For example, the fake AP selector 311 may call the API 313 and instruct the API 313 to find IP addresses of routers existing on the routing paths of the AP which are scanned by the AP scanner 305. The API 313 may directly find the IP addresses based on the instruction or may call another function or procedure belonging to the OS and find the IP addresses, and may provide a result to the fake AP selector 311.

Alternatively, a separate IP address grasper rather than the fake AP selector 311 may be included in the application 305 to find the IP addresses. For example, the IP address grasper may directly find the IP addresses or may find the IP addresses by calling the API 313.

The inputter/outputter 322 performs functions which are equal or similar to those of the element using reference numeral 110 in FIG. 2, and thus a detailed description thereof is omitted.

In the exemplary embodiment of FIG. 7, the terminal 300 may download the application 305 from an external server through the Internet, and may store the application 305 in a hard disk, which is one of the hardware resources 318.

The OS 307 may make the application 305, which is downloaded from the external server in the hard disk, stored in an executable state, and may display an icon to run the application 305 through the inputter/outputter 222 when the application 305 is executable. For example, the OS 307 may provide icons of applications which are executable in the terminal 300 on a screen for the user, and the user may execute an application by selecting the icon.

According to an exemplary embodiment, the application 305 may be executed according to a user's command or may be automatically executed without a user's command.

Although the fake AP selector selects the attacker terminal (or fake AP) and calculates the reliability in the above-described exemplary embodiment, this is merely an example. A separate element to select the attacker terminal may be provided and the fake AP selector may calculate the reliability.

Also, a program for the terminal 100 to execute all or at least part of the above-described methods may be provided.

Also, a computer readable recording medium which stores a program for the terminal 100 to execute all or at least part of the above-described methods may be provided. Such a recording medium may be included in the terminal 100 or may be included in any server which is connected with the terminal 100 through a network. In this case, such a server is connected with the terminal and supports the terminal to execute all or at least part of the above-described methods While exemplary embodiments have been particularly shown and described above, it will be understood by those of ordinary skill in the art that various changes in form and details may be made therein without departing from the spirit and scope of the present invention as defined by the following claims.

What is claimed is:

1. A method for selecting an AP for a portable terminal, the method comprising:
   receiving a plurality of packets by a communicator from a plurality of APs which provide wireless communication services;
   analyzing the received plurality of packets by an FP selector and calculating reliability for security of the plurality of APs by the FP selector; and
   selecting, by the FP selector, a fake AP based on the calculated reliability,
   wherein the reliability is calculated based on all of the following situations:
   a situation in which two APs have different SSIDs but have the same MAC address;
   a situation in which two APs have different SSIDs and MAC addresses but reception signal strengths of the APs are equal or similar to one another;
   a situation in which two APs have the same MAC address and reception signal strengths of the APs are equal;
   a situation in which two APs have different SSIDs but reception signal strength of the APs are equal; and
   a situation in which an AP uses 3G or 4G at a back end.

2. The method as claimed in claim 1, wherein the reliability is calculated further based on situations including:
   a situation in which an AP has a MAC address that is not assigned to an AP manufacturer; and
   a situation in which an AP is a portable AP.

3. The method as claimed in claim 1, wherein the reliability is calculated further based on a situation in which an AP has a routing path different from a pre-stored routing path.

4. The method as claimed in claim 1, wherein the reliability is calculated further based on a situation in which two APs have the same SSID and the same routing path.

5. The method as claimed in claim 1, wherein the reliability is calculated further based on situations including:
   a situation in which an AP changes encryption methods in a predetermined order; and
   a situation in which an AP is included in a pre-stored black list or white list.

6. The method as claimed in claim 1, wherein the reliability is calculated further based on a situation in which an AP has a hidden SSID.

7. The method as claimed in claim 1, wherein the reliability is calculated further based on a situation in which two APs use the same channel.

8. The method as claimed in claim 1, wherein the reliability is calculated further based on a situation in which locations of an AP are changed with time more than a predetermined reference number of times.

\* \* \* \* \*